March 5, 1957 W. T. HAGE 2,783,948
PRESSURE RESPONSIVE MECHANICAL ELECTRICAL RATIO
CONTROLLER FOR AIR SWEPT PULVERIZER FEED
Filed Oct. 1, 1953 3 Sheets-Sheet 2

INVENTOR
*William T. Hage*
BY
*J. P. Moran*
ATTORNEY

INVENTOR
William T. Hage
BY
[signature]
ATTORNEY

United States Patent Office 2,783,948
Patented Mar. 5, 1957

2,783,948

PRESSURE RESPONSIVE MECHANICAL ELECTRICAL RATIO CONTROLLER FOR AIR SWEPT PULVERIZER FEED

William T. Hage, Alliance, Ohio, assignor to The Babcock & Wilcox Company, New York, N. Y., a corporation of New Jersey Application October 1, 1953, Serial No. 383,661

6 Claims. (Cl. 241—34)

This invention relates to a pressure-responsive mechanical-electrical ratio controller useable in regulating the operation of a raw material feeder to an air-swept pulverizer. This application is a continuation-in-part of my co-pending application Serial No. 227,715, filed May 22, 1951, for "Pressure Responsive Mechanical Electrical Ratio Controller."

The pressure differential across an air-swept pulverizer is a measure of the quantity of material in the pulverizer and the pressure drop between two points along the air supply path is a measure of the rate of air supply through the pulverizer. For best operating results at any given output or load, it is desirable to maintain a constant ratio between the quantity of air and the pulverized material leaving the pulverizer, and an optimum level of material in the pulverizer, in order to attain the most efficient overall pulverizer performance as regards quality of product and power consumption.

In air-swept pulverizer installations, particularly when used for supplying pulverized fuel to furnace burners, the primary or carrier air supply through the pulverizer is varied with the load or fuel demand, as by a suitable control system. By controlling the rate of feeding material to the pulverizer, and consequently the level of fuel in the pulverizer, in accordance with the measured pressure drop along the air supply path, the material-to-air ratio can be maintained constant for a given output of the pulverizer. The pressure differential across the pulverizer is a function of the air flow through, and the fuel level in, the pulverizer.

My said co-pending application shows and describes a novel and simple ratio controller for the pulverizer feeder, which is adapted to automatically maintain any desired ratio between the primary air flow and the amount of material, or pulverized fuel, delivered by the pulverizer. To this end, means are provided for measuring the pressure drop along the primary air supply path and the pressure differential through the pulverizer. Through the medium of a pair of electromechanical transducers, these pressure differential determinations are separately converted into corresponding electric potentials. The potentials are suitably combined to produce a control or signal voltage, and this voltage is utilized to determine the operation of a control element in the control circuit for the electrically controlled pulverizer feeding means to vary the pulverizer feeding rate thereof in correspondence with the rate of air supply to the pulverizer.

Means are provided to adjust the relative values of the two potentials corresponding to the respective pressure differentials, thereby effecting a change in the slope of the load line, or in the air-material ratio. Other means are provided for adjusting the threshold value of the control voltage to thereby change the position of the load line. These adjustment means may desirably comprise simple potentiometers or adjustable resistances.

The present invention is directed to an improved ratio controller of the foregoing type in which conversion of the pressure differential determinations into corresponding electric potentials, combining of the electric potentials to produce a signal voltage, amplification of the signal voltage to provide a control voltage, and utilization of the control voltage to vary the pulverizer feeding rate in correspondence with its rate of air supply are all effected by magnetic devices and without the use of electronic valves or of relays. Additionally, the biasing means for adjusting the threshold value of the signal voltage comprises a magnetic device. Thereby a novel ratio controller is provided in which the continuity of operation is not adversely affected by the relatively limited useful life of electronic valves or of relay contacts, resulting in a rugged, compact controller suitable for use under severe operating conditions.

For an understanding of the invention principles, reference is made to the following description of typical embodiments thereof as illustrated in the accompanying drawings.

Figure 1:
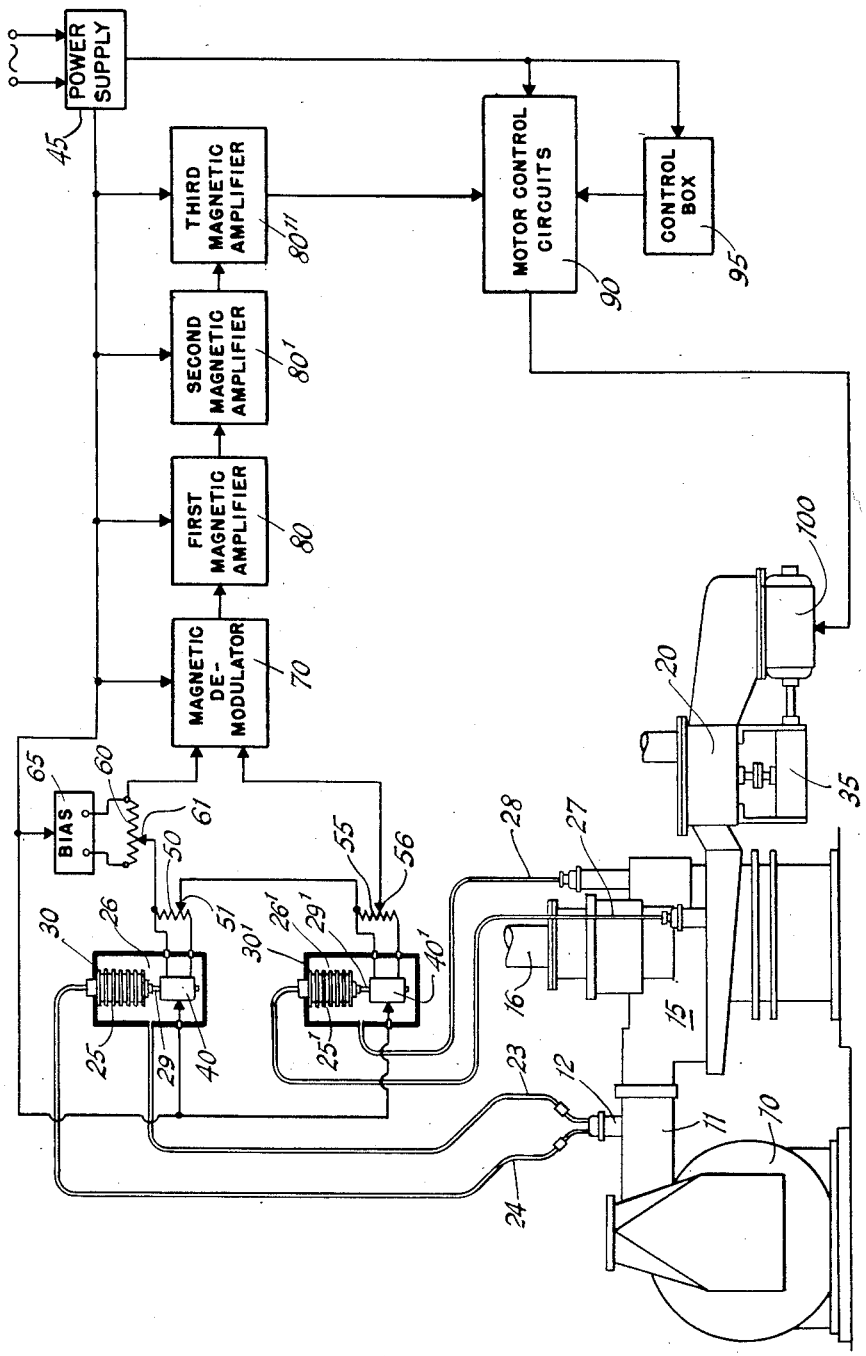
Fig. 1 is a schematic elevation view of an air-swept pulverizer installation embodying the invention ratio controller.
Figure 2:
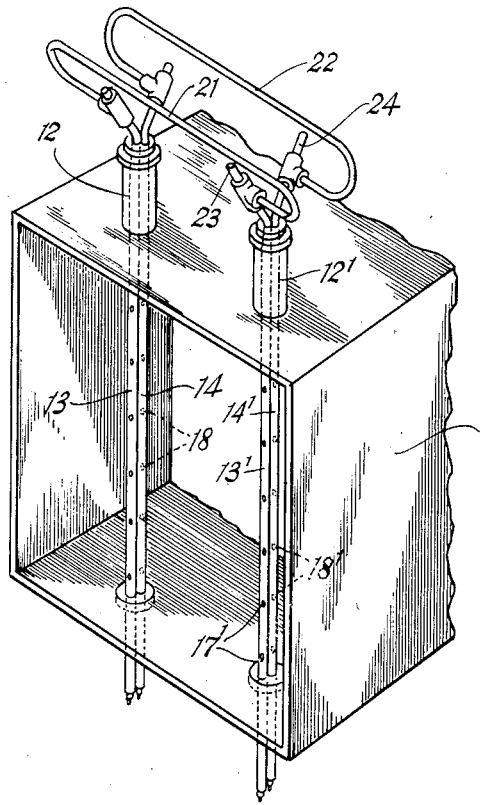
Fig. 2 is a sectional perspective view of the air flow rate determining arrangement for the air supply conduit.

Referring to Fig. 1, primary air is delivered by a fan 10 through a duct or conduit 11 to a pulverizer 15 supplied with coal by a feeder 20 driven by an electric motor through a gear reducer 35, an air-borne stream of pulverized coal being delivered from pulverizer 15 through a discharge pipe 16. The velocity head through duct 11, which is a measure of the rate of flow of the air therethrough, is determined by a Pitot tube arrangement 12 shown more clearly in Fig. 2.

Referring to this latter figure, the Pitot tube arrangement comprises two pairs of apertured tubes such as 13, 14 and 13', 14' which extend across duct 11, the respective pairs of tubes being spaced transversely of the duct. In practice, the tubes of each pair are suitably brazed or otherwise secured together as a unit. The apertures 17 of tube 13 open in the opposite direction from the apertures 18 of tube 14, the same being true of the apertures 17' and 18' of the tubes 13' and 14'.

Each pair of tubes is brought out through the top of the conduit into mounting or coupling means 12 and 12', with the tubes 13 and 13' being interconnected by a conduit 21 and the tubes 14 and 14' by a conduit 22. With the arrangement shown in Fig. 2, a number of connections may be made but, for the purpose of the present invention, only two (2) taps 23 and 24 are used. Tap 24 is connected to the interior of a bellows 25 mounted in a sealed compartment 26 of a transducer 30. Tap 23 is connected directly to the interior of compartment 26, so that bellows 25 is responsive to the velocity head measured by the taps 23 and 24.

Similarly, the pressure differential through pulverizer 15 is determined by a pair of pressure taps 27 and 28, with tap 27 being connected near the air input of pulverizer 15 and tap 28 near the air output or exit of the pulverizer. The pressure of tap 27 is applied to the interior of a bellows 25' mounted in a sealed compartment 26' of a second transducer 30', and the pressure of tap 28 is applied to the interior of compartment 26'. Thus, bellows 25' is responsive to the difference in pressures measured by taps 27 and 28.

With the arrangement so far described, movement of bellows 25 is responsive to the rate of air flow through conduit 11, and movement of bellows 25' is responsive to the pressure differential through pulverizer 15.

In accordance with the invention, means are provided to convert these pressure determinations separately into corresponding electric potentials. For this purpose, bellows 25 has connected thereto an armature or plunger 29 of magnetic material, such as iron, and bellows 25' has connected thereto a similar armature 29'. Plunger 29 is movable within a coil 40 and plunger 29' is movable within a coil 40'. Coils 40 and 40' have an alternating current potential applied thereto, in a manner described more fully hereinafter, from power supply 45. The output of coil 40 is applied across a resistor 50 having an adjustable tap 51, and the output of coil 40' is applied across a resistor 55 having an adjustable tap 56. The resistors 50 and 55 are connected in series in such polarity relation that the voltage drops thereacross are in opposition.

With a steady alternating current potential applied to the coils 40 and 40', the output potentials of these coils are dependent upon the positions of armatures 29 and 29' therein. The positions of these armatures are, in turn, controlled by the bellows 25 and 25'. In turn, the extent of dilation of bellows 25 is a measure of the rate of air flow through duct 11, and the extent of dilation of bellows 25' is a measure of the pressure differential through pulverizer 15. Hence, the potentials applied to resistors 50 and 55 correspond, respectively, to the rate of primary air flow through duct 11 and the pressure differential through pulverizer 15. These electric potentials are used to produce a net control voltage corresponding to the resultant of the measured air supply rate and the measured pressure drop across the pulverizer, and this control voltage is applied to a control element in the supply circuit of motor 100 which controls the feed of material to pulverizer 15. The rate of material feed governs the material level in the pulverizer and thus governs the pressure drop across the pulverizer for a given air flow.

Adjustable tap 51 is connected to one end of resistor 55. The corresponding end of resistor 50 is connected to the adjustable tap 61 of a resistor 60 having a bias voltage applied thereacross by a bias voltage regulator 65 supplied with an A. C. potential from supply 45 as described more fully hereinafter. Thus, resistors 50, 55, and 60 are connected in series with each other with the relative potential derived across each resistor being adjustable by its associated tap.

The A. C. signal voltage derived from the combined outputs of transducers 30 and 30', with its threshold value adjusted by regulator 65, is applied to the input terminals of a magnetic demodulator 70. Demodulator 70 derives, from the A. C. signal input, a D. C. signal output which is amplified by a first magnetic amplifier 80, and further amplified by successive magnetic amplifiers 80' and 80'', to provide a D. C. control voltage, at the output of magnetic amplifier 80'', proportional to the A. C. signal input to magnetic demodulator 70.

As will be described more fully hereinafter, this D. C. control voltage from magnetic amplifier 80'' is applied to the control coil of a saturable reactor whose power coil is included in the supply circuit for motor 100, this reactor and the motor controls being grouped in a controller 90 with which is associated a control box 95 for starting the pulverizer and selecting either manual or automatic operation therefor.

The relative phase of the input to demodulator 70 is governed by the relative values of the potential drops across resistors 50, 55, and depends upon which of these potential drops has the greater value. The relative phase of the A. C. input to the demodulator in turn controls the relative polarity of the D. C. output of the latter. This relative polarity in turn, determines the ultimate sense of the connective change applied to the control coil of the reactor in controller 90.

Figure 3:
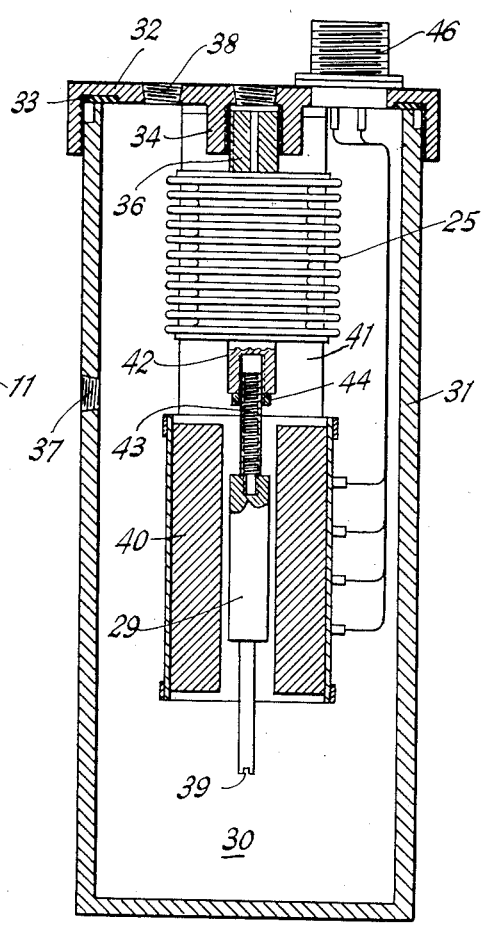
Fig. 3 is a sectional view of a magnetically operable mechanical-electric transducer forming part of the invention controller.

Fig. 3 illustrates the transducer 30 which is identical with the transducer 30'. The sealed space 26 is provided by a container 31 to which is secured a cap 32, a sealing gasket 33 being interposed between the container rim and the cap. Cap 32 has a nipple 34, opening through the cap, into which is screwed a nipple 36 on bellows 25. Connection 24 is secured into the opening of nipple 34. Taps 37, 38 in container 31 and cap 32 are provided for connection 23, the tap not used being closed by a suitable plug. The transformer coils 40 are supported from cap 32 by a bracket 41, the coils being coaxially aligned with bellows 25. The lower face of bellows 25 carries a threaded socket 42 in which is threaded a stud 43 threadedly connected to movable core 29. The lower end of the latter has a kerf 39 by means of which stud 43 can be turned to adjust the position of core 29 relative to coils 40, the lock nut 44 being provided on stud 42 to maintain the adjusted position. The electrical connections to coils 40 are provided by a connector 46 mounted in cap 32.

Figure 6:
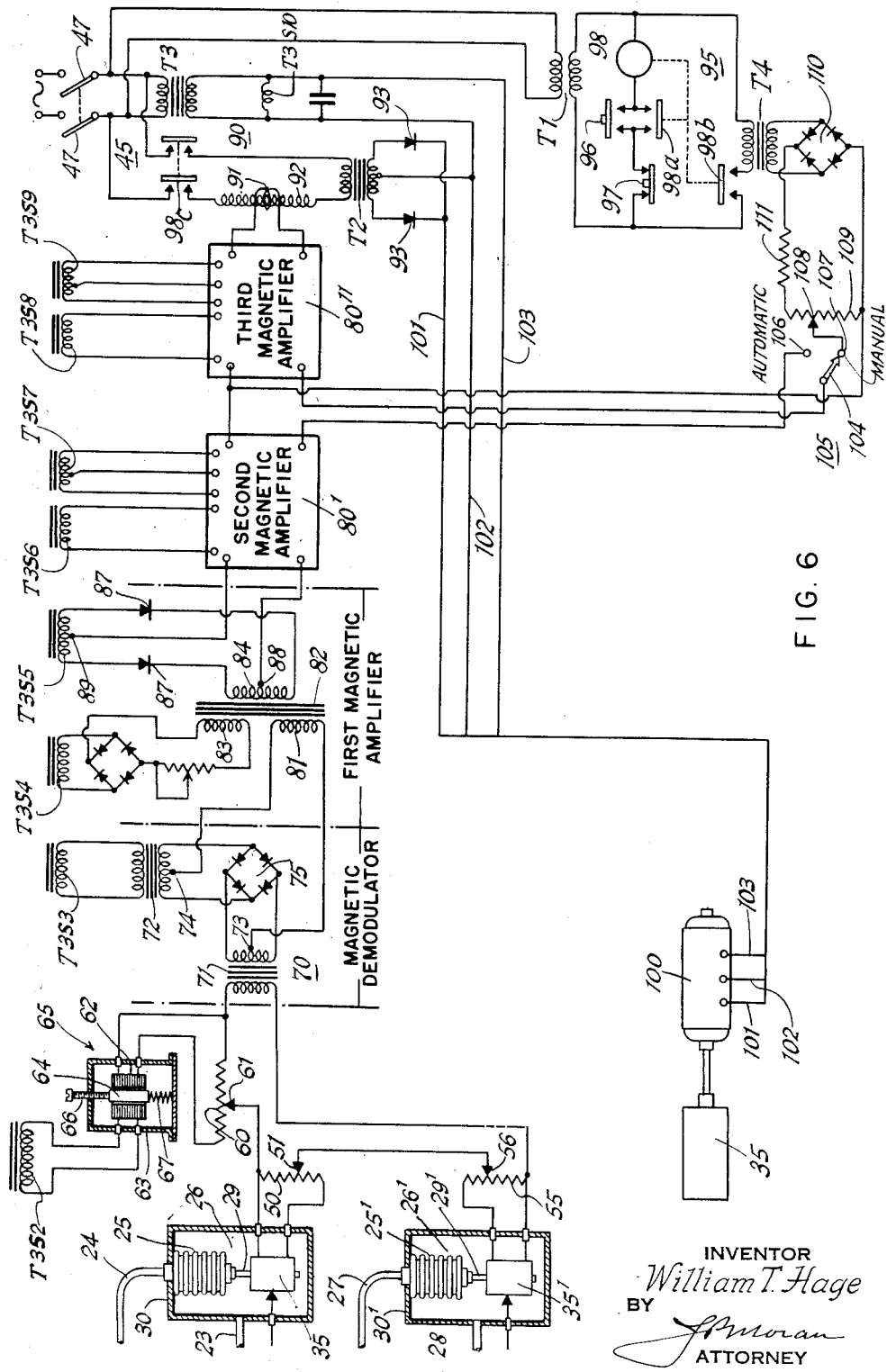
Fig. 6 is a schematic wiring diagram of the master supply and control panel of the pulverizer installation.

The schematic wiring diagram of the controller is shown in Fig. 6. In this figure, the internal structure of bias device 65, the internal connections of demodulator 70 and amplifier 80, and the circuits of motor controller 90 and control box 95 are illustrated. As amplifiers 80' and 80'' are essentially similar to amplifier 80, their internal connections have not been illustrated.

Power supply 45 includes disconnect switches 47 for connection of the controller to, for example, a 440-volt, 60 cycle, A. C. supply. A transformer T1 supplies power, at a reduced voltage to control box 95, a transformer T2 is provided in the armature circuit of motor 100, and a transformer T3 is connected in the field circuit of motor 100. This latter transformer has a plurality of secondary windings, T3S1 through T3S9 for supplying power to the motor field, bias device 65, demodulator 70, and magnetic amplifiers 80, 80' and 80''.

Transformer secondary T3S2 supplies A. C. to coil 62 of bias device 65, this coil being suitably mounted in a casing 63. A movable core 64 is mounted in coil 62, being adjustable by a stud 66 mounted in casing 63 and counterbalanced by a spring 67. Adjustment of the position of core 64 in coil 62, through turning stud 66, determines the bias voltage applied across resistor 60 as derived from secondary T3S2.

The A. C. signal voltage from the resistor combination 50—55—60, as adjusted by taps 51, 56, 61, is applied to the primary of a transformer 71 of demodulator 70. The secondary of transformer 71 has its ends connected to opposite points of a full wave rectifier 75. Secondary T3S3 of transformer T3 supplies 115 volts A. C. to the primary of a transformer 72 whose secondary has its ends connected to the other pair of opposite points of rectifier 75. With the disclosed connections, demodulator 70 converts the input A. C. signal voltage on the primary of transformer 71 to a corresponding D. C. output voltage between the midpoint 73, of the secondary of transformer 71, and the midpoint 74 of the secondary of transformer 72.

This D. C. output voltage is applied to the control primary 81 of transformer 82 of first magnetic amplifier 80. The bias primary 83 of transformer 82 is connected, through a potentiometer 86, across a full wave rectifier 85 supplied from secondary T3S4. Secondary T3S5 of transformer T3 supplies power to the secondary 84 of transformer 82, through rectifiers 87, the secondary input voltage being 11 volts in the illustrative example. The amplified D. C. signal voltage is derived between midpoint 88, of secondary 84 of transformer 82, and midpoint 89 of secondary T3S5 of transformer T3.

This amplified D. C. output voltage is applied to the input terminals of the second stage magnetic amplifier 80' whose bias voltage is supplied from secondary T3S6 of transformer T3. The power voltage for amplifier 80' is supplied, at 21 volts A. C., from secondary T3S7 of transformer T3.

During "automatic" operation, the amplified D. C. signal voltage, derived in the same manner as in magnetic amplifier 80, is applied to the control primary of the input transformer of third stage magnetic amplifier 80''. This amplifier has its bias and power voltages supplied, respectively, by secondaries T3S8 and T3S9 of transformer T3, with the power supply being at 115 volts A. C. in the illustrative example.

The D. C. control voltage from the output of magnetic amplifier 80'' is applied across the D. C. control coil 91 of a saturable reactor having its power coil 92 connected in series with the 440 v. supply to the primary of motor armature transformer T2. The ends of the secondary of transformer T2 are connected, through rectifiers 93, to the armature lead 101 of motor 100, and the secondary midpoint is connected to the common armature and field lead 102 of motor 100. By virtue of the saturable reactor 91—92, the power input to transformer T2, and thus the armature current of motor 100, is varied in correspondence with the D. C. signal voltage applied to reactor control coil 91. Thus, the motor armature current is varied in accordance with the adjusted A. C. signal voltage derived from transducers 30 and 30'. Thereby, the coal feed to pulverizer 15 is varied in accordance with variations in the air flow therethrough corresponding to fuel demand.

The field supply for motor 100 is derived from secondary T3S10 of transformer T3, this secondary having one end connected to common motor lead 102 and the other end connected to motor field lead 103. A by-pass condenser 94 is connected across secondary T3S10.

The control box 95 includes a "start" button 96 in series with a "stop" button 97 and a contactor coil 98. When "start" button 96 is operated, coil 98 is energized to close contacts 98a, 98b, and 98c. Contact 98a shunts button 96, contact 98b connects the secondary of transformer T1 to the primary of a transformer T4, and contacts 98c close the supply circuit to motor armature transformer T2. The motor 100 is thus energized to start the coal feed.

Whether the coal feed is automatically or manually controlled depends upon the position of the movable arm 104 of an "automatic-manual" selector switch 105. This arm is connected to one input terminal of third stage magnetic amplifier 80'', and is selectively engageable with an "automatic" contact 106 or a "manual" contact 107. Contact 106 is connected to one output terminal of second stage magnetic amplifier 80'. One connection between amplifiers 80' and 80'' is thus controlled by switch 105, being closed in the "automatic" position of switch 105 when arm 104 engages contact 106.

Contact 107 is connected to the adjustable tap 108 of a potentiometer 109 connected, in series with a limiting resistor 111, across opposite points of a full wave rectifier 110 supplied from the secondary of transformer T4. Thus, when switch arm 104 engages "manual" contact 107, the D. C. control input to amplifier 80'' is supplied from rectifier 110 and manually adjusted by potentiometer tap 108.

To place the controller in operation, disconnect switches 57 are closed and "start" push button 96 is depressed to close contactor 98. If arm 104 is engaged with contact 106, closure of the "start" push-button sets the pulverizer operation on "automatic" and this operation continues as long as desired. Normally, however, the switch 105 is thrown to the "manual" position in starting the system, with the speed being adjusted by contact 108 until such time as a sufficient supply of material has been delivered to the pulverizer to maintain normal operation. The switch 105 is then thrown to the "automatic" position so that further feeding of material is controlled in accordance with variations in the rate of primary air flow. This latter, in turn, particularly in furnace installations, is a measure of the load on the pulverizer.

Figure 4:
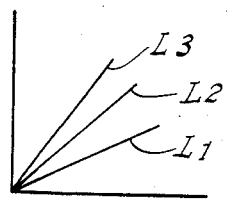
Figs. 4 and 5 are graphs illustrating changes in the slope and position respectively of the load line.
Figure 5:
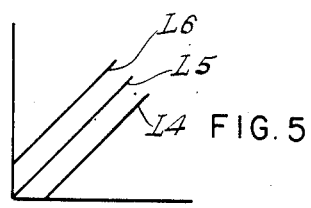

Figs. 4 and 5 illustrate how the slope and position of the load line may be changed in a relatively simple manner by the system of the present invention. In both of these figures, the load line represents the relation between the rate of air flow and the pulverizer pressure differential, these two factors being plotted as a pair of perpendicularly related co-ordinates. Referring to Fig. 4, three different angular relations of the load line L are illustrated, representing three different ratios of the air flow and the pulverizer differential pressure. The three positions, $L_1$, $L_2$ and $L_3$, or any other angular position, are selected by adjustment of taps 51 and 56 (Figs. 1 or 6) along resistors 50 and 55. This changes the relative effects of the potential drops across resistors 50 and 55 on the output control voltage.

The change in the absolute position of the load line L is illustrated in Fig. 5. This is accomplished by shifting the tap 61 of potentiometer 60 which changes the absolute value of the control voltage. In the present instance, such change in the relation of the two factors, and the change in the position of the load line can be simply and easily effected by making the controlling resistors of the type operable by turning a knob or pointer. These knobs can be suitably calibrated with a scale, and both mounted at a suitable accessible operating point.

While specific embodiments of the invention have been shown and described in detail to illustrate the application of the invention principles, it will be understood that the invention may be otherwise embodied without departing from such principles.

I claim:

1. A ratio controller for maintaining an optimum ratio between a pair of variables comprising, in combination, a pair of magnitude determining means each operable to determine the magnitude of a different one of the variables; a pair of transducers, each associated with a different one of said magnitude determining means, and effective to respectively convert the determined magnitudes into corresponding mechanical movements; a pair of movable core transformers each having its core connected for movement by a different one of said transducers; means applying an A. C. potential to the inputs of said transformers; a pair of adjustable impedances connected in series and each connected across the output of a different one of said transformers to provide an A. C. signal voltage proportional to the resultant of the determined magnitudes; magnetic amplifier means having its input connected across said impedances and effective to provide an amplified D. C. control voltage corresponding to such A. C. signal voltage; means controlling the magnitude of one variable; an electric motor driving said last-named means; a supply circuit connecting said motor to a source of A. C. potential; and a saturable reactor having its control coil connected to the output of said magnetic amplifier means and its power coil connected in the motor supply circuit to vary the operation of said motor in accordance with variations in such resultant of the determined magnitudes of the variables.

2. A ratio controller for maintaining an optimum ratio between a pair of variables comprising, in combination, a pair of magnitude determining means each operable to determine the magnitude of a different one of the variables; a pair of transducers, each associated with a different one of said magnitude determining means, and effective to respectively convert the determined magnitudes into corresponding mechanical movements; a pair of movable core transformers each having its core connected for movement by a different one of said transducers; means applying an A. C. potential to the inputs of said transformers; a pair of adjustable impedances connected in series and each connected across the output of a different one of said transformers to provide an A. C. signal voltage proportional to the resultant of the determined magnitudes; a third movable core transformer; means applying an A. C. potential to the input of the latter; an adjustable impedance connected across the output of said third transformer and in series with said first two impedances; manually operable means for adjusting the position of the core of said third transformer to pre-set the threshold value of such A. C. signal voltage; magnetic amplifier means having its input connected across said impedances and effective to provide an amplified D. C. control voltage corresponding to such A. C. signal voltage; means controlling the magnitude of one variable; an electric motor driving said last-named means; a supply circuit connecting said motor to a source of A. C. potential; and a saturable rector having its control coil connected to the output of said magnetic amplifier means and its power coil connected in the motor supply circuit to vary the operation of said motor in accordance with variations in such resultant of the determined magnitudes of the variables.

3. A ratio controller for maintaining an optimum ratio between a pair of variables comprising, in combination, a pair of magnitude determining means each operable to determine the magnitude of a different one of the variables; a pair of transducers, each associated with a different one of said magnitude determining means, and effective to respectively convert the determined magnitudes into corresponding mechanical movements; a pair of movable core transformers each having its core connected for movement by a different one of said transducers; means applying an A. C. potential to the inputs of said transformers; a pair of adjustable impedances connected in series and each connected across the output of a different one of said transformers to provide an A. C. signal voltage proportional to the resultant of the determined magnitudes; a first magnetic amplifier having its input connected across said impedances and effective to provide an amplified D. C. control voltage corresponding to such A. C. signal voltage; a second magnetic amplifier effective to provide an amplified D. C. output corresponding to a D. C. potential applied to its input; means controlling the magnitude of one variable; an electric motor driving said last-named means; a supply circuit connecting said motor to a source of A. C. potential; a saturable reactor having its control coil connected to the output of said second magnetic amplifier and its power coil connected in the motor supply circuit; a manually adjustable potentiometer; a source of D. C. potential connected across said potentiometer; and a selector switch in circuit connection with the output of said first amplifier, the input of said second amplifier, and said potentiometer; said selector switch being selectively operable to connect such D. C. output potential to the input of said second magnetic amplifier, automatically to vary the operation of said motor in accordance with variations in such resultant of the determined magnitudes of the variables, or to connect said potentiometer to the input of said second magnetic amplifier to manually vary the operation of said motor.

4. For use with an air-swept pulverizer of the type arranged to discharge a fluent mixture of pulverized material and air, and including draft means for supplying carrier air to the pulverizer, an electric motor operated feeder for delivering material to the pulverizer, means for measuring the pressure drop across at least a portion of the pulverizer and means for measuring the rate at which air is supplied to the pulverizer; a control system for said feeder comprising a pair of transducers, each associated with a different one of said measuring means, and effective to respectively convert the measured pressure drop and the measured air supply rate into corresponding mechanical movements; a pair of movable core transformers each having its core connected for movement by a different one of said transducers; means applying an A. C. potential to the inputs of said transformers; a pair of adjustable impedances connected in series and each connected across the output of a different one of said transformers to provide an A. C. signal voltage proportional to the resultant of the determined magnitudes; magnetic amplifier means having its input connected across said impedances and effective to provide an amplified D. C. control voltage corresponding to such A. C. signal voltage; a supply circuit connecting said motor to a source of A. C. potential; and a saturable reactor having its control coil connected to the output of said magnetic amplifier means and its power coil connected in the motor supply circuit to vary the operation of said feeder in accordance with variations in such resultant of the measured variables.

5. For use with an air-swept pulverizer of the type arranged to discharge a fluent mixture of pulverized material and air, and including draft means for supplying carrier air to the pulverizer, an electric motor operated feeder for delivering material to the pulverizer, means for measuring the pressure drop across at least a portion of the pulverizer and means for measuring the rate at which air is supplied to the pulverizer; a control system for said feeder comprising a pair of transducers, each associated with a different one of said measuring means, and effective to respectively convert the measured pressure drop and the measured air supply rate into corresponding mechanical movements; a pair of movable core transformers each having its core connected for movement by a different one of said transducers; means applying an A. C. potential to the inputs of said transformers; a pair of adjustable impedances connected in series and each connected across the output of a different one of said transformers to provide an A. C. signal voltage proportional to the resultant of the determined magnitudes; a third movable core transformer; means applying an A. C. potential to the input of the latter; an adjustable impedance connected across the output of said third transformer and in series with said first two impedances; manually operable means for adjusting the position of the core of said third transformer to pre-set the threshold value of such A. C. signal voltage; magnetic amplifier means having its input connected across said impedances and effective to provide an amplified D. C. control voltage corresponding to such A. C. signal voltage; a supply circuit connecting said motor to a source of A. C. potential; and a saturable reactor having its control coil connected to the output of said magnetic amplifier means and its power coil connected in the motor supply circuit to vary the operation of said feeder in accordance with variations in such resultant of the measured variables.

6. For use with an air-swept pulverizer of the type arranged to discharge a fluent mixture of pulverized material and air, and including draft means for supplying carrier air to the pulverizer, an electric motor operated feeder for delivering material to the pulverizer, means for measuring the pressure drop across at least a portion of the pulverizer and means for measuring the rate at which air is supplied to the pulverizer; a control system for said feeder comprising a pair of transducers, each associated with a different one of said measuring means, and effective to respectively convert the measured pressure drop and the measured air supply rate into corresponding mechanical movements; a pair of movable core transformers each having its core connected for movement by a different one of said transducers; means applying an A. C. potential to the inputs of said transformers; a pair of adjustable impedances connected in series and each connected across the output of a different one of said transformers to provide an A. C. siganl voltage proportional to the resultant of the determined magnitudes; a first magnetic amplifier having its input connected across said impedances and effective to provide an amplified D. C. control voltage corresponding to such A. C. signal voltage; a second magnetic amplifier effective to provide an amplified D. C. output corresponding to a D. C. potential applied to its input; a supply circuit connecting said motor to a source of A. C. potential; a saturable reactor having its control coil connected to the output of said second magnetic amplifier and its power coil connected in the motor supply circuit; a manually adjustable potentiometer; a source of D. C. potential connected across said potentiometer; and a selector switch in circuit connection with the output of said first amplifier, the input of said second amplifier, and said potentiometer; said selector switch being selectively operable to connect such D. C. output potential to the input of said second magnetic amplifier, automatically to vary the operation of said feeder in accordance with variations in such resultant of the measured variables, or to connect said potentiometer to the input of said second magnetic amplifier to manually vary the operation of said motor.

References Cited in the file of this patent

UNITED STATES PATENTS

| | | |
|---|---|---|
| 2,226,923 | Cross | Dec. 31, 1940 |
| 2,404,937 | Anderson | July 30, 1946 |
| 2,419,436 | Boho | Apr. 22, 1947 |
| 2,427,903 | Crites | Sept. 23, 1947 |